(12) United States Patent
Guo et al.

(10) Patent No.: US 12,124,048 B2
(45) Date of Patent: Oct. 22, 2024

(54) OPTICAL ENGINE SYSTEM AND DISPLAY APPARATUS

(71) Applicant: APPOTRONICS CORPORATION LIMITED, Guangdong (CN)

(72) Inventors: Zuqiang Guo, Guangdong (CN); Peng Du, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 427 days.

(21) Appl. No.: 17/594,767

(22) PCT Filed: Jun. 24, 2020

(86) PCT No.: PCT/CN2020/098221
§ 371 (c)(1),
(2) Date: Oct. 28, 2021

(87) PCT Pub. No.: WO2020/259619
PCT Pub. Date: Dec. 30, 2020

(65) Prior Publication Data
US 2022/0214553 A1     Jul. 7, 2022

(30) Foreign Application Priority Data
Jun. 28, 2019 (CN) .......................... 201910579658.5

(51) Int. Cl.
*G02B 27/10*    (2006.01)
*G02B 26/08*    (2006.01)
*G03B 21/00*    (2006.01)

(52) U.S. Cl.
CPC ..... *G02B 27/1006* (2013.01); *G02B 26/0833* (2013.01); *G02B 26/0883* (2013.01); *G03B 21/008* (2013.01)

(58) Field of Classification Search
None
See application file for complete search history.

(56) References Cited

U.S. PATENT DOCUMENTS

2008/0180640 A1   7/2008  Ito
2018/0259839 A1*  9/2018  Okuda ............... G02B 27/0972

FOREIGN PATENT DOCUMENTS

CN    1591084 A     3/2005
CN    101398536 A   4/2009
(Continued)

OTHER PUBLICATIONS

ISA China National Intellectual Property Administration, International Search Report Issued in Application No. PCT/CN2020/098221, Sep. 28, 2020, WIPO, 4 pages.

*Primary Examiner* — Bao-Luan Q Le
*Assistant Examiner* — Danell L Owens
(74) *Attorney, Agent, or Firm* — McCoy Russell LLP

(57) ABSTRACT

Disclosed are an optical engine system and a display apparatus. The optical engine system includes: a first modulation device configured to modulate first linearly polarized light in a first optical path to obtain first modulated light; a second modulation device configured to modulate second linearly polarized light in a second optical path to obtain second modulated light, the first linearly polarized light and the second linearly polarized light having a same polarization state; and a light combining prism configured to guide the first modulated light and the second modulated light to transmit along a same optical path and obtain projection light. Optical paths of the first modulated light, the second modulated light, and the projection light are located in a same plane.

20 Claims, 8 Drawing Sheets

(56) References Cited

FOREIGN PATENT DOCUMENTS

| | | | |
|---|---|---|---|
| CN | 106200217 A | | 12/2016 |
| CN | 206321932 U | * | 7/2017 |
| CN | 108227356 A | | 6/2018 |

* cited by examiner

ND DISPLAY
OPTICAL ENGINE SYSTEM AND DISPLAY APPARATUS

CROSS REFERENCE TO RELATED APPLICATIONS

The present application is a U.S. National Phase of International Application No. PCT/CN2020/098221 entitled "OPTICAL ENGINE SYSTEM AND DISPLAY APPARATUS," and filed on Jun. 24, 2020. International Application No. PCT/CN2020/098221 claims priority to Chinese Patent Application No. 20190579658.5 filed on Jun. 28, 2019. The entire contents of each of the above-listed applications are hereby incorporated by reference for all purposes.

TECHNICAL FIELD

The present disclosure relates to the technical field of display, and to an optical engine system and a display apparatus.

BACKGROUND AND SUMMARY

This background is intended to provide a background or context for the detailed embodiments of the present disclosure as claimed in the claims. The description herein shall not be regarded as prior art just because it is described in this section of the specification.

A traditional movie projector usually uses an optical engine system with a large-size three-chip spatial light modulator. The optical engine system with the three-chip spatial light modulator usually uses a Phillips prism for color separation and color combination. As shown in FIG. 1, a light combining prism P1 in the optical engine system 10 includes a first prism S11 and a second prism S12. Illumination light transmits through coated layers respectively located between the first prism S11 and air, and between the second prism S12 and air for color separation, and then transmits through the coated layer for color combination after being modulated by the spatial light modulators N1, N2 and N3. Since the incident illumination light and emitted projection beam of the spatial light modulators N1, N2, N3 have a certain divergence angle, usually at +/−12 degrees, the transmittance curve for transmitting through the coated layer at different angles may be different (deviation), and the deviation amount of the transmittance curve will increase along with an incident angle. As shown in FIG. 2 and FIG. 3, since the incident angle of the illumination light on the coated layer is relatively small, the transmittance curve for the coated layer is sharp, a transition area is relatively narrow, and the deviation amount of a spectral line with the incident angle is relatively small. Therefore, the light combining prism P1 has high light separating and light combining efficiencies.

However, a manufacturing tolerance may be introduced in a process for manufacturing the coated layer, that is, there is a difference between the transmittance curve of the coated layer and an ideal transmittance curve, and the transmittance curve of the coated layer has an increased deviation amount as the incident angle of the incident illumination light increases, therefore, the coated layer causes great loss of light energy in a process of light combining and light separating at a large angle.

According to a first aspect of the present disclosure, an optical engine system is provided, including: a first modulation device configured to modulate first linearly polarized light in a first optical path to obtain first modulated light; a second modulation device configured to modulate second linearly polarized light in a second optical path to obtain second modulated light, the first linearly polarized light and the second linearly polarized light having a same polarization state; and a light combining prism configured to guide the first modulated light and the second modulated light to transmit along a same optical path and obtain projection light. The optical paths of the first modulated light, the second modulated light, and the projection light are located in a same plane.

According to a second aspect of the present disclosure, a display apparatus is provided, and the display apparatus includes the above-mentioned optical engine system.

BRIEF DESCRIPTION OF THE FIGURES

In order to explain the technical solutions in embodiments of the present disclosure more clearly, the drawings used in the description of embodiments will be briefly described below. Apparently, the drawings as described below are only some embodiments of the present disclosure. Those skilled in the art, without creative effort, may obtain other drawings based on these drawings, in which.

Reference signs of the main elements are described as follows:

| | |
|---|---|
| Optical engine system | 10, 120, 220, 320 |
| Light combining prism | P1, P |
| Light combining coated layer | G |
| Glue layer | H |
| First prism | S11, S1 |
| Second prism | S12, S2 |
| Spatial light modulator | N1, N2, N3 |
| Normal | n |
| Incident angle | x1, x2, x |
| display apparatus | 100, 200, 300 |
| light source | 110 |
| Linearly polarized light converter | 123, 223, 323 |
| First modulation device | M1 |
| Second modulation device | M2 |
| Illumination light | a |
| Linearly polarized light | b |
| First linearly polarized light | c1 |
| Second linearly polarized light | c2 |
| First modulated light | d1 |
| Second modulated light | d2 |
| Guiding element | 126, 226 |

| -continued | |
|---|---|
| First total internal reflection prism | T1 |
| Second total internal reflection prism | T2 |
| Double fly-eye lens | 122, 222 |
| Optical integrator rod | 322 |
| Relay lens | 121, 124 |
| Reflection element | 225, 325 |

The present disclosure will be further described in the following embodiments in combination of the above figures.

DETAILED DESCRIPTION

In order to better illustrate the above objectives, and features and advantages of the present disclosure, the present disclosure will be described in detail below with reference to the accompanying drawings and specific embodiments. It should be noted that the embodiments and the features in the embodiments can be combined with each other if there is no conflict.

In the following description, various specific details are set forth in order to better illustrate the present disclosure, and the described embodiments are merely some embodiments rather than all embodiments of the present disclosure. Based on the embodiments of the present disclosure, all other embodiments obtained by those ordinary skilled in the art without creative work shall fall within the protection scope of the present disclosure.

Unless otherwise defined, all technical and scientific terms used herein have the same meaning as commonly understood by those skilled in the art. The terms used in the description of the present disclosure herein are only for a purpose of describing the detailed embodiments, but are not intended to limit the present disclosure.

Figure 1:
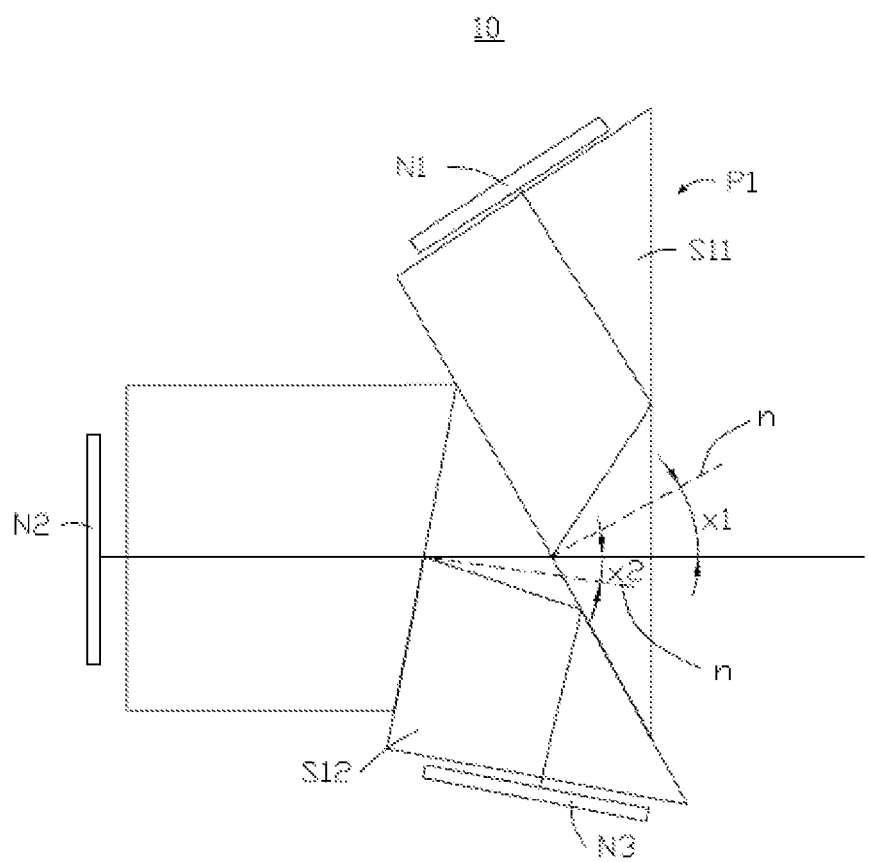
FIG. 1 is a schematic structure diagram of an optical engine system applied to a three-chip spatial light modulator.
Figure 2:
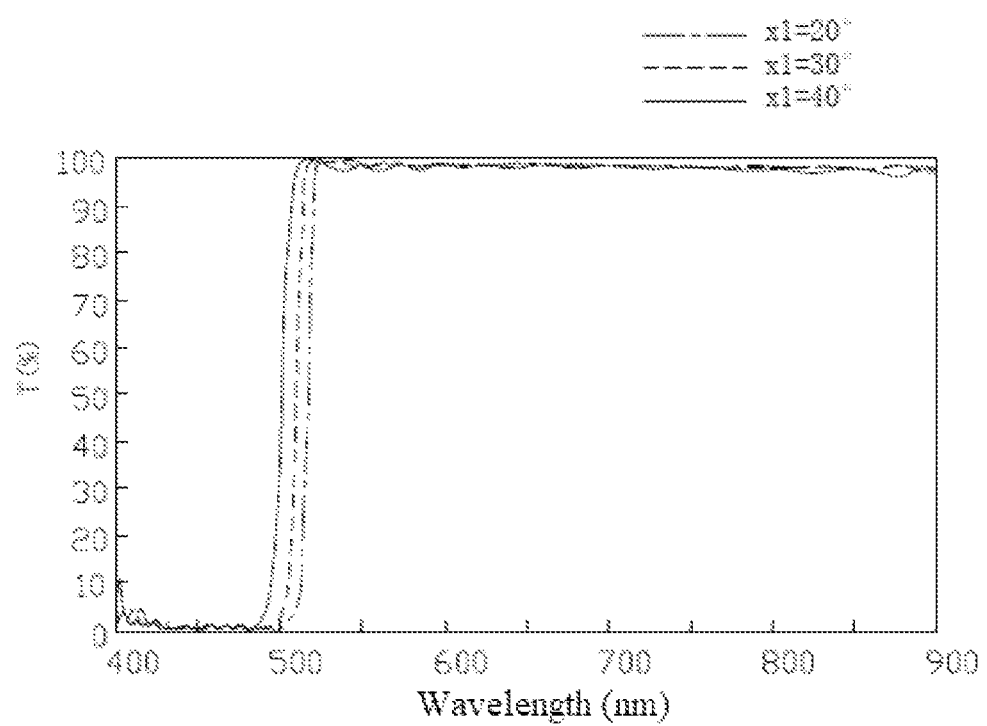
FIG. 2 is a light transmittance curve of a coated layer of a light combining prism in the optical engine system shown in FIG. 1.
Figure 3:
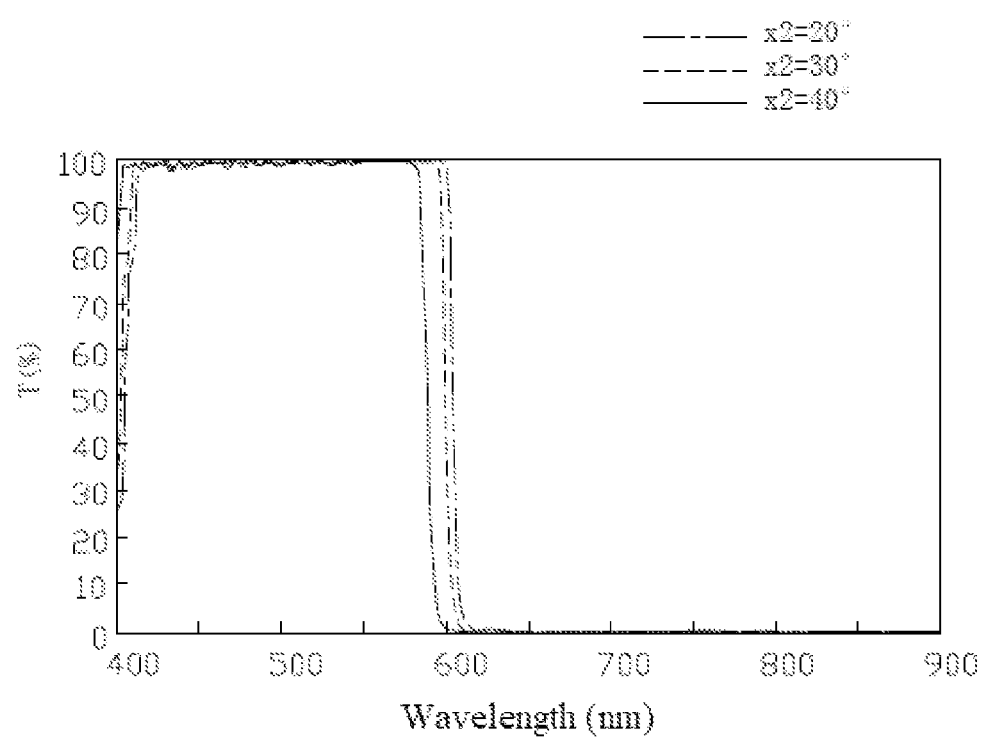
FIG. 3 is a light transmittance curve of another coated layer of the light combining prism in the optical engine system shown in FIG. 1.

As shown in FIG. 1, a surface of the first prism S11 and a surface of the second prism S12 are each coated with a dichroic medium film. When light is incidence on the first prism S11 and the second prism S12, color separation and color combination are achieved. An incident angle x1 is formed between the light incident onto the first prism S11 and a normal line n of the first prism S11; an incident angle x2 is formed between the light incident onto the second prism S12 and a normal line n of the second prism S12, where the x1 and x2 are relatively small. The incident angle x1 is generally 30 degrees, and the angle x2 is generally about 10 degrees, which are both less than a critical angle of a base material (glass material) of the prism. Therefore, an air gap between the first prism S11 and the second prism S12 can achieve color separation and color combination; since a difference between refractive indexes of the media of the first and second prisms S11, S12 and air is large, the design of the coated layer is less difficult, and the transmittance of the coated layer slightly varies with the incident angle, therefore, color separation and color combination when illumination light of natural light transmits through the Phillips prism have relatively high efficiencies. Therefore, the Phillips prism has been widely applied for color combination commonly in 3-chip spatial light modulators, and is suitable for cinema projectors.

The disclosure provides an efficient optical engine system and a display apparatus including the optical engine system. The display apparatus can be a cinema projector, an engineering machine or a high-end home theater. The optical engine system according to the present disclosure can not only realize the compactness and miniaturization of a product, but also achieve a higher brightness, so that the product has a higher cost performance.

Figure 4:
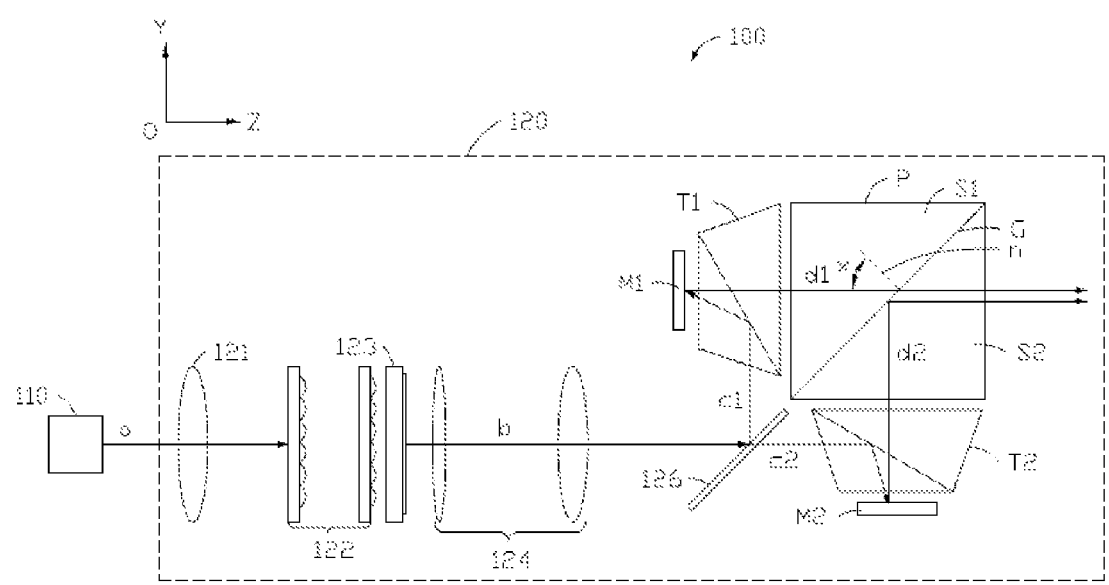
FIG. 4 is a schematic structure diagram of a display apparatus according to the first embodiment of the present disclosure.

Referring to FIG. 4, a display apparatus 100 in this embodiment includes a light source 110 and an optical engine system 120. The light source 110 is configured to provide the optical engine system 120 with illumination light a, and the illumination light a is unpolarized light, that is, the illumination light a is light having multiple polarization states. The optical engine system 120 is configured to modulate the illumination light a according to image data, to obtain projection light for projection.

Further, the light source 110 is configured to emit the illumination light a. In this embodiment, the illumination light a changes color in timing sequence. For example, the illumination light a includes red light, green light, and blue light emitted in timing sequence, and includes at least one of laser and fluorescent. In an embodiment, the illumination light a includes yellow light and blue light emitted in timing sequence. In an embodiment, the illumination light a includes red right, green light, yellow light or orange light and blue light emitted in timing sequence. In an embodiment, the illumination light a is white light.

Specifically, the light source 110 includes an excitation light source and a wavelength conversion element. The excitation light source is configured to emit excitation light, which may be blue laser. The wavelength conversion element is provided with a wavelength conversion material, which generates red fluorescence and green fluorescence in the illumination light a under an excitation of the excitation light, and the excitation light including the laser is scattered and is then emitted from the light source 110 as blue-primary-color light in the illumination light a.

In this embodiment, the light source 110 further includes a supplementary light source, and the supplementary light source is configured to emit at least one of red laser and green laser to be combined with the red fluorescent light and the green fluorescent light as red-primary-color light and the red-primary-color light in the illumination light a, increasing a display brightness of the display apparatus 100 and expanding a color gamut of the display apparatus 100.

Figure 5:
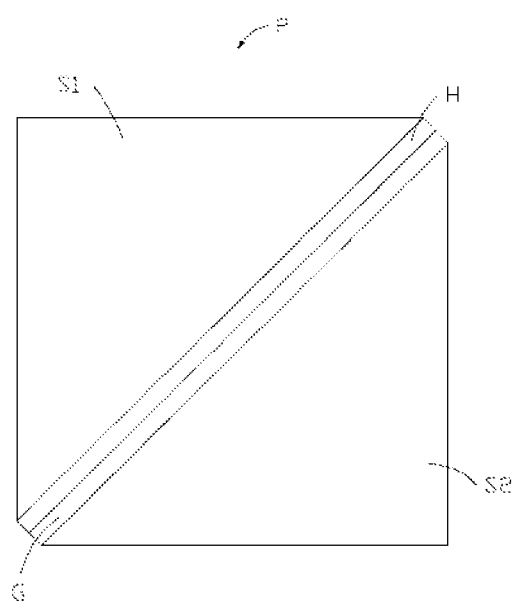
FIG. 5 is a schematic structure side view of the light combining prism shown in FIG. 4.
Figure 6:
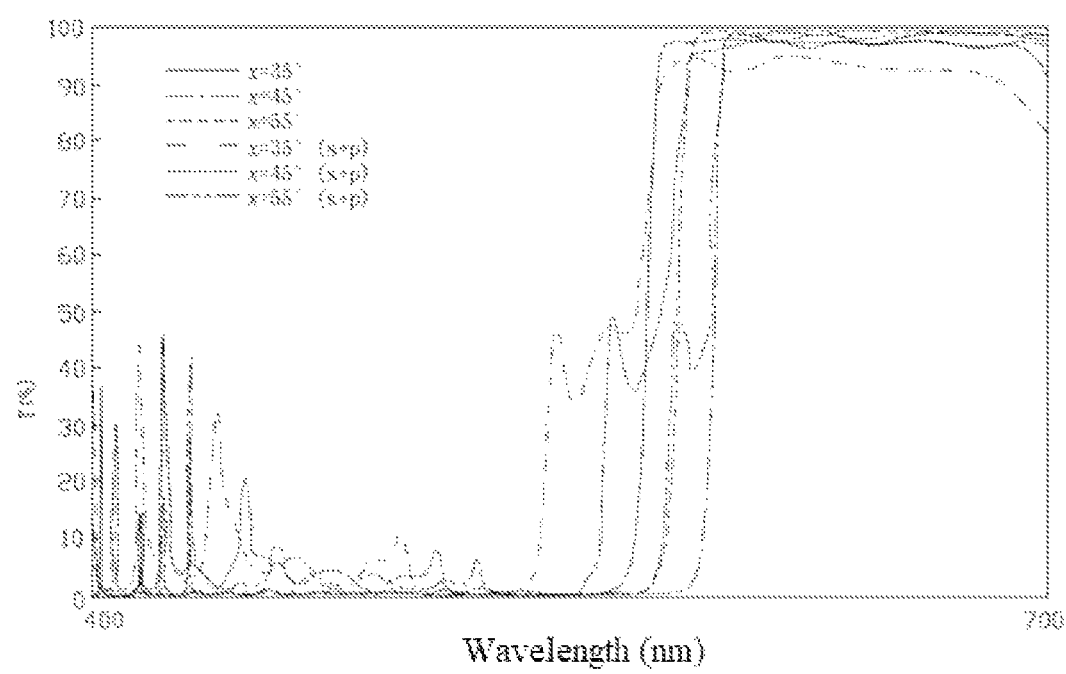
FIG. 6 is a light transmittance curve of a light combining coated layer in the light combining prism shown in FIG. 4.

Referring to FIG. 4 and FIG. 5, the optical engine system 120 includes a linearly polarized light converter (PCS) 123, a first modulation device M1, a second modulation device M2, and a light combining prism P. The PCS123 is configured to convert the illumination light a emitted by the light source 110 into linearly polarized light b having a single linear polarization state. The first modulation device M1 is configured to modulate first linearly polarized light c1 that is obtained from the linearly polarized light b and transmitted along a first optical path, to obtain first modulated light d1, and a transmission direction of the first optical path is a direction from bottom to top in FIG. 4, that is, a positive direction of Y-axis. The second modulation device M2 is configured to modulate second linearly polarized light c2 that is obtained from the linearly polarized light b and transmitted along a second optical path, to obtain second modulated light d2, and a transmission direction of the second optical path is a direction from left to right in FIG. 4, that is, a positive direction of Z-axis. The light combining prism P includes two prisms, namely a first prism S1 and a second prism S2, and a glue layer H is provided between the first prism S1 and the second prism S2. The glue layer H includes glue to bond the first prism S1 and the second prism S2. As shown in FIG. 6, a surface of the second prism S2 bonded to the glue layer H is provided with a light combining coated layer G. In other embodiments, a surface of the first prism S1 and/or the second prism S2 bonded to the glue layer H is provided with a light combining coated layer G. The first modulated light d1 and the second modulated light d2 are guided by the light combing coated layer G to be transmitted along a same optical path, to obtain projection light for projection.

In a propagation direction of the linearly polarized light b, a light vector vibrates only in a constant direction, thus a track of an end of the light vector is a straight line. The linearly polarized light b may be p light or s light. Since linear polarization states of the first linearly polarized light c1 and the second linearly polarized light c2 are the same, for example, they both are p light or s light, the first linearly polarized light c1 may be linearly polarized light b of one color, and the second linearly polarized light c2 may be other light in the linearly polarized light b, for example, the first linearly polarized light c1 includes red light in the linearly polarized light b, and the second linearly polarized light c2 includes blue light and green light in the linearly polarized light b. Alternatively, the first linearly polarized light c1 includes red light and blue light in the linearly polarized light b, and the second linearly polarized light c2 includes green light in the linearly polarized light b. Alternatively, the first linearly polarized light c1 includes red light and part of blue light in the linearly polarized light b, and the second linearly polarized light c2 includes green light and the remaining part of blue light in the linearly polarized light b.

As shown in FIG. 4, the first modulated light d1 and the second modulated light d2 are combined at the light combining coated layer G, and the light combining coated layer G is actually a light combining surface of the light combining prism P. Incident angles x at which the first modulated light d1 and the second modulated light d2 are incident onto the light combining coated layer G are both 45 degrees, and the two prisms of the light combining prism P are made of glass, and the incident angle x is greater than a total reflection angle of light from the glass to air. In other words, after the first modulated light d1 is incident on the first prism S1, it will not be emitted from an interface between the first prism S1 and air, but rather a total internal reflection occurs at the interface between the first prism S1 and air, and thus the first modulated light d1 is confined inside the first prism S1.

The total reflection angle is related to refractive indexes of the two media through which light passes. To avoid a total reflection of the first modulated light d1 at the light combining prism P, surfaces of the first prism S1 and the second prism S2 that the first modulated light d1 is expected to pass through are glued to each other by the glue layer H, so that the first modulated light d1 exits from the first prism S1, passes through the glue layer H and the light combining coated layer G, and is then incident to the second prism S2.

Since the glue layer H and the light combining coated layer G adjacent to each other are provided between the first prism S1 and the second prism S2, the first modulated light d1 passes through the glue layer H and the light combining coated layer G successively, and is then combined with the second modulated light d2. Designing and manufacturing of the combining light coated layer G are difficult, and since the incident angles of the first modulated light d1 and the second modulated light d2 are relatively large, the transmittance curve has a greater deviation amount for different incident angles, reducing the light combining efficiency of the optical prism P. Especially for natural light, since layer-coating curves of the two polarization states of s light and p light will be separated from each other, and a separation amount of the two layer-coating curves is greater when the light incident angle changes, the optical engine system for natural light as the illumination light will have a serious light efficiency loss if such a 45-degree combining light method is adopted, and thus it will be difficult to achieve high-lumen product specifications. However, the 45-degree light combining method for the prism can achieve a shorter light combining optical path, and thus it is easier to achieve a compact and miniaturized product structure, which is beneficial to design and decreased cost of the lens.

The light combining coated layer G in the light combining prism P is configured to adjust a transmission direction of the light according to a wavelength range of the incident light. Specifically, the light combining coated layer G is a dichroic light separating film, to guide the first modulated light d1 and the second modulated light d2 to be transmitted along a same optical path. Specifically, in this embodiment, the dichroic light separating film is configured to transmit red light and reflect green light and blue light. It can be understood that the dichroic light separating film can be flexibly configured as required. In one embodiment, the dichroic light separating film in the light combining prism P is configured to transmit red light and part of blue light, and reflect green light and part of blue light. Accordingly, the first modulation device M1 is configured to modulate red light and blue light in timing sequence, and the second modulation device M2 is configured to modulate green light and blue light in timing sequence.

Referring to FIG. 6, which illustrates a transmittance curve of the dichroic light separating film of the light-combining coated layer G in the light-combining prism P, and in which different line types indicate the transmittance and wavelength curve of a light having a single linear polarization and the transmittance and wavelength curve of natural light (s light+p light). It can be seen from the figure that a transition area of the transmittance curve of natural light is wider, and a deviation amount of the curve is greater with the incident angle; while the transmittance curve of the light having a single linear polarization is sharper and compact, and a deviation amount of the curve is smaller with the incident angle. Therefore, after illumination light a is converted into linearly polarized light b, the color combination efficiency at the light combining prism P is higher, and it is less affected by the incident angle.

In addition, since the optical engine system 120 of the present disclosure has a high polarization-preserving efficiency for polarized light, that is, after the linearly polarized light incident to the optical engine system is transmitted, reflected, and modulated, a polarization state of the modulated light that exits is substantially the same as a polarization state of the linearly polarized light when being incident, when being used for 3D display, the luminous flux does not change as compared to being used in the 2D mode, thereby achieving a higher 3D efficiency.

In this embodiment, the first modulation device M1 and the second modulation device M2 are both digital micro-mirror devices (DMD). In one embodiment, the first modulation device M1 and the second modulation device M2 may also be liquid crystal or liquid crystal on silicon light modulation devices.

As shown in FIG. 4, the optical engine system 120 further includes a guiding element 126, which is configured to separate the linearly polarized light b into first linearly polarized light c1 transmitted along a first optical path and second linearly polarized light c2 transmitted along a second optical path according to a wavelength range. Further, the guiding element 126 is configured to reflect part of light in the linearly polarized light b to obtain the first linearly polarized light c1, and to transmit the remaining part of light in the linearly polarized light b to obtain the second linearly polarized light c2. Specifically, the guiding element 126 may be a dichroic plate for reflecting red light and transmitting green light and blue light, without changing a linear polarization state of the incident polarized light b. The first linearly polarized light c1 on the first optical path is incident onto the first modulation device M1, and the second linearly polarized light c2 on the second optical path is incident onto the second modulation device M2.

The optical engine system 120 further includes a first total internal reflection (TIR) prism T1 and a second total internal reflection (TIR) prism T2. The first TIR prism T1 is configured to guide the first linearly polarized light c1 emitted from the guiding element 126 to be incident to the first modulation device M1, and to guide the first modulated light d1 emitted from the first modulation device M1 to be incident to the light combining coated layer G, and the second TIR prism T2 is configured to guide the second linearly polarized light c2 emitted from the guiding element 126 to be incident to the second modulation device M2, and to guide the second modulated light d2 emitted from the second modulation device M2 to be incident to the light combining coated layer G.

As shown in FIG. 4, a paper plane is a yoz plane, and the optical paths of the first modulated light d1, the second modulated light d2, and the projection light (the light emitted from the light combining prism P) are located in a same plane, i.e., the yoz plane. Therefore, the linear polarization state of the linearly polarized light b has a higher maintenance during a color combining process of the light combining prism P. Just because of excellent polarization preserving of the optical engine system 120, the transmittance curve of the linearly polarized light b for color combination at the light combining prism P can maintain a small deviation amount, which is beneficial to increase of light combining efficiency of the light combining prism P. In an embodiment, the light combining prism P further includes other incident light, and the optical paths of the incident light and the exit light of the light combining prism P are located in a same plane, thereby increasing the light combining efficiency of the light combining prism P.

Further, the optical paths of the first linearly polarized light c1, the second linearly polarized light c2, the first modulated light d1, the second modulated light d2, and the projection light emitted from the light combining prism P are located in a same plane, i.e., the yoz plane. Therefore, the linear polarization state of the linearly polarized light b has a higher maintenance during the processes of color separation at the guiding element 126, the first modulation device M1 modulating the light, the second modulation device M2 modulating the light, and color combination of the light combining prism P. Just because of excellent polarization reserving of the optical engine system 120, the transmittance curves of color separation and color combination of the linearly polarized light b at the guiding element 126 and the light combining prism P can be maintained at a small deviation amount, and cut-off wavelengths of color separation and color combination are kept consistent, which is beneficial to increase of the light combining efficiency of the optical engine system 120. In an embodiment, the guiding element 126 further includes other incident light and exit light, and optical paths of the incident light and the exit light of the guiding element 126 are located in a same plane, thereby increasing the light separating efficiency of the guiding element 126.

Specifically, positions and light exit angles of the guiding element 126, the first TIR prism T1, the second TIR prism T2, the first modulation device M1, the second modulation device M2, and the light combining prism P can be adjusted such that the optical paths of the first modulated light d1, the second modulated light d2 and the projection light emitted from the light combining prism P are located in a same plane, or the optical paths of the first linearly polarized light c1, the second linearly polarized light c2, the first modulated light d1, the second modulated light d2, and the projection light emitted from the light combining prism P are all located in a same plane. It can be understood that in other embodiments, the optical paths of the first modulated light d1, the second modulated light d2, and the projection light emitted from the light combining prism P are all located in a plane different from the yoz plane, or the first linearly polarized light c1, the second linearly polarized light c2, the first modulated light d1, the second modulated light d2, and the projection light emitted from the light combining prism P are all located in a plane different from the yoz plane.

As shown in FIG. 4, the optical engine system 120 further includes a light homogenizing device. In this embodiment, the light homogenizing device is a double fly-eye lens 122. The illumination light a is incident to the linearly polarized light converter 123 through the double fly-eye lens 122, which is configured to homogenize the illumination light a and also shape the illumination light a, for example expand a divergence angle of the illumination light a, so that the illumination light a has a larger spot area formed on the linearly polarized light converter 123.

The optical engine system 120 further includes a relay lens 121 and a relay lens 124. The illumination light a emitted by the light source 110 passes through the relay lens 121, the double fly-eye lens 122, the linearly polarized light converter 123, and the relay lens 124 successively, and is then incident to the guiding element 126. It can be understood that the optical engine system 120 may further include other necessary optical elements.

In one embodiment, the illumination light emitted by the light source 110 has a single linear polarization state, and the illumination light emitted by the light source 110 is linearly polarized light, and the linearly polarized light converter 123 is omitted in the optical engine system 120.

The optical engine system 120 in this embodiment uses illumination light a (linearly polarized light b) having a single linear polarization state on the basis of maintaining that the first modulated light d1 and the second modulated light d2 are incident to the light combining coated layer G at 45 degrees at the light combining prism P, and in designing of the optical path of the optical engine system 120, the linearly polarized light b is color separated and color combined in the two-dimensional plane yoz, so that the linearly polarized light b is maintained in a relatively good linear polarization state during transmission, thereby improving a light combining efficiency of the light combining prism P. In addition, if there is a lot of loss when the fluorescence in the illumination light a is separated at the guiding element 126 and is combined at the light combining prism P, the color coordinates of red light and green light separated from the fluorescence itself are better. In order to achieve a color gamut standard of DCI-P3, an amount of laser supplemented in the illumination light a will be quite small. Since the loss of the fluorescence is relatively large, and the supplemented laser is relatively small, it is difficult to achieve a brightness index of the whole machine. The optical engine system 120 in this embodiment ensures that the illumination light a has a higher efficiency in light separating and combining in the optical path, and therefore it is beneficial to increase of the brightness of the projection light emitted from the display apparatus 100. When being used for 3D display, the luminous flux does not change as compared with being used in the 2D mode, and a higher 3D efficiency can be achieved.

Figure 7:
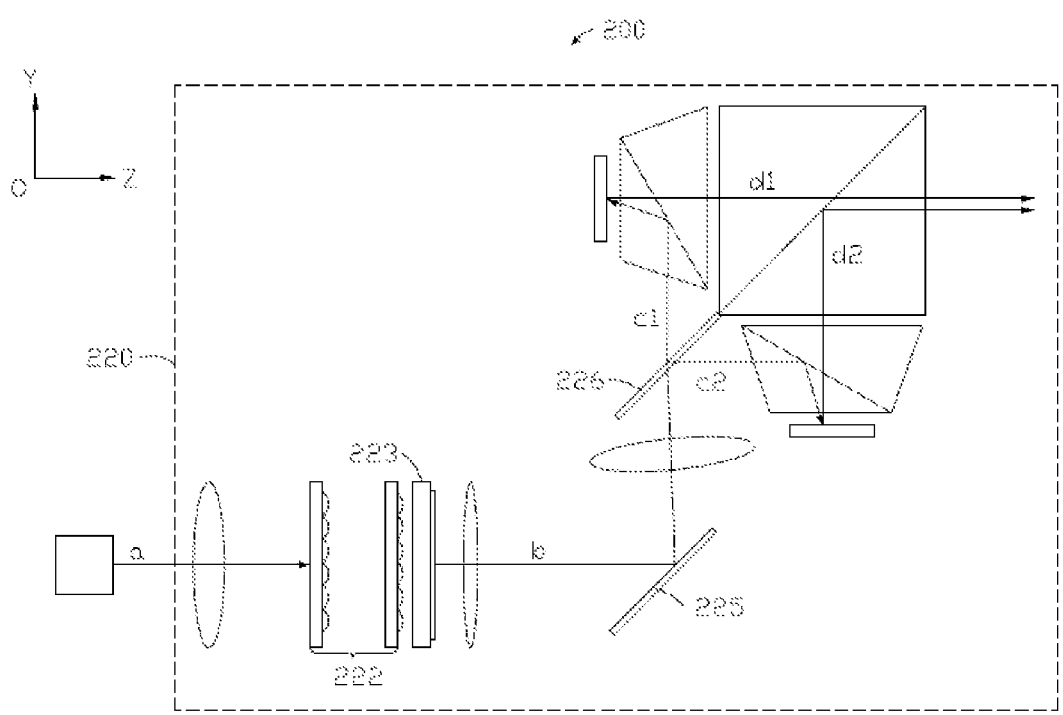
FIG. 7 is a schematic structure diagram of a display apparatus according to a second embodiment of the present disclosure.

Referring to FIG. 7, in a second embodiment, the optical engine system 220 of the display apparatus 200 further includes a reflection element 225. Specifically, the linearly polarized light b emitted from the linearly polarized light converter 223 is reflected by the reflection element 225, and is then incident to the guiding element 226. The reflection element 225 may include a mirror of high-reflection dielectric film or a mirror of metal film, so that the optical path of the linearly polarized light b is reflected and folded in the yoz plane. When the linearly polarized light b is reflected at the reflection element 225, the polarization direction of the linearly polarized light b can be parallel or perpendicular to a reflection surface of the reflection element 225. After being reflected, the linear polarization state of the linearly polarized light b can remain unchanged, thereby ensuring the efficiencies in following color separating and color combining. Therefore, while ensuring a condition of the linear polarization of the transmitted light in the optical engine system 220, the addition of the reflection element 225 can enable a volume and a size of the optical engine system 220 to be flexibly changed, and an angle at which the first linearly polarized light c1 and the second linearly polarized light c2 enters the first modulation device M1 and the second modulation device M2, as well as the light spot thereof, can be adjusted and corrected. In this embodiment, both of the optical paths of incident light and exit light of the reflection element 225 are provided with relay lenses.

Since an incident surface of the linearly polarized light b received by the guiding element 226 is different from the guiding element 126, in this embodiment, the guiding element 226 is configured to transmit part of the linearly polarized light b to obtain the first linearly polarized light c1, and to reflect part of the linearly polarized light b to obtain the second linearly polarized light c2. Specifically, the guiding element 226 is configured to transmit red light and to reflect green light and blue light. The optical engine system 220 with a high efficiency in this embodiment can not only achieve compactness and miniaturization of the product, but also achieve a higher brightness.

Figure 8:
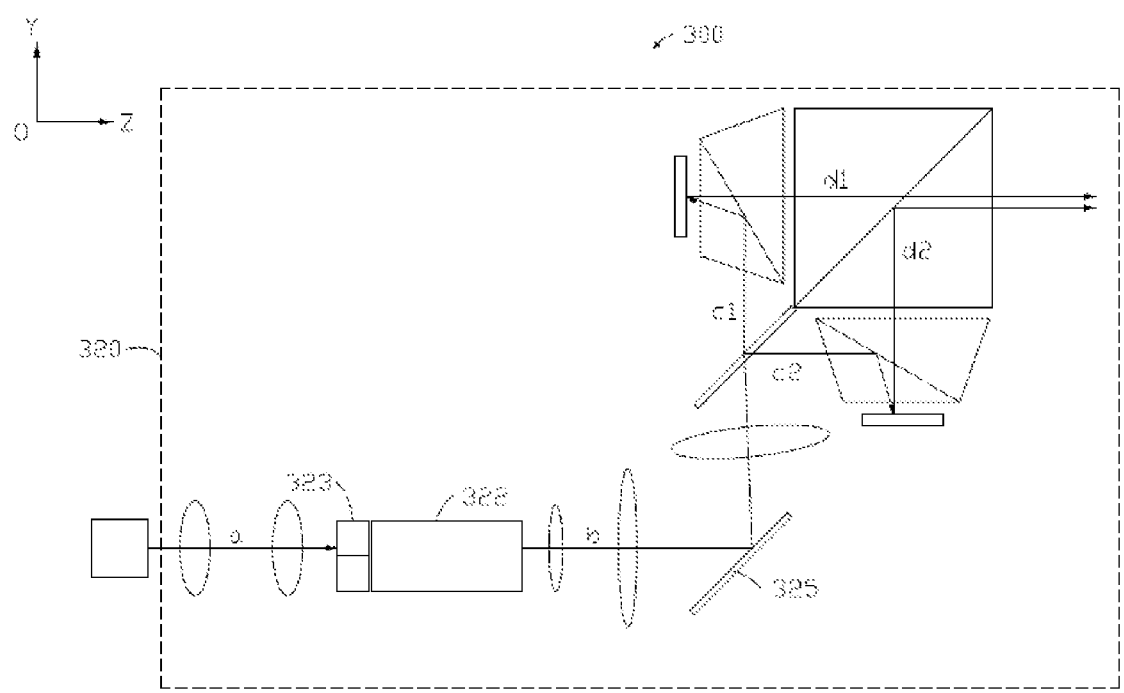
FIG. 8 is a schematic structure diagram of a display apparatus according to a third embodiment of the present disclosure.

Referring to FIG. 8, as compared with the display apparatus 200 in the second embodiment, in the optical engine system 320 of the display apparatus 300 in a third embodiment, an optical integrator rod 322 is used to replace the double fly-eye lens 222 in the optical engine system 220. Specifically, the illumination light a passes through the linear polarized light converter 323 to obtain the linearly polarized light b, and the linearly polarized light b passes through the optical integrator rod 322 and is then incident to the reflection element 325. The optical integrator rod 322 homogenizes the linearly polarized light b while maintaining the linear polarization of linearly polarized light b.

The light combining prism in the optical engine system and the display apparatus according to the present disclosure guides the first modulated light and the second modulated light to combine colors in a same plane, and a plane in which light is emitted from the first modulator and the second modulator is the same as a light combining plane of the light combining prism, so that the original linear polarization state of the first modulated light and the second modulated light during the color combination process is better maintained, and a color combination efficiency thereof is higher, enabling to achieve higher 3D display brightness and efficiency.

It should be noted that, within a scope of the features of the present disclosure, various specific solutions in various embodiments can be applied to each other, and in order to save space and to avoid repetition, no further details are described herein.

For those skilled in the art, it is obvious that the present disclosure is not limited to the details of the above exemplary embodiments, and the present disclosure can be implemented in other specific forms without departing from the essential features of the present disclosure. Therefore, from any point of view, all embodiments shall be considered exemplary and non-limiting. The scope of the present disclosure is defined by the appended claims rather than the above description, and therefore all modifications falling within the meaning and scope of the equivalent elements of the claims are included in the present disclosure. Any reference sign in the claims shall not be regarded as limiting the claims involved. In addition, it is obvious that the term "including/comprising" does not exclude other elements or steps, and the singular does not exclude the plural. Multiple devices stated in the device claims may also be implemented by one device or system by means of a software or hardware. Terms such as "first" and "second" are used to denote names, rather than denoting any specific order.

Finally, it should be noted that the above embodiments are merely used to illustrate the technical solutions of the present disclosure, but not to limit thereto. Although the present disclosure has been described in detail with reference to the embodiments, those skilled in the art should understand that the technical solutions of the present disclosure may be modified or equivalently replaced without departing from the scope of the technical solutions of the present disclosure.

The invention claimed is:

1. An optical engine system, comprising:
    a first modulation device configured to modulate first linearly polarized light in a first optical path to obtain first modulated light;
    a second modulation device configured to modulate second linearly polarized light in a second optical path to obtain second modulated light, the first linearly polarized light and the second linearly polarized light having a same polarization state; and
    a light combining prism comprising a first lens, a second lens, and a light combining coated layer located between the first lens and the second lens, and configured to guide the first modulated light and the second modulated light to transmit along a same optical path and obtain projection light,
    wherein optical paths of the first modulated light, the second modulated light, and the projection light are located in a same plane, and the first modulated light, the second modulated light, and the projection light have a substantially same polarization state.

2. The optical engine system according to claim 1, wherein the light combining coated layer is configured to adjust a transmission direction of incident light based on a wavelength range of the incident light.

3. The optical engine system according to claim 2, further comprising a guiding element configured to separate, based on a wavelength range, received linearly polarized light into the first linearly polarized light transmitted along the first optical path and the second linearly polarized light transmitted along the second optical path.

4. The optical engine system according to claim 3, wherein the guiding element is configured to reflect part of the linearly polarized light with at least one color to obtain the first linearly polarized light, and to transmit the remaining part of the linearly polarized light to obtain the second linearly polarized light.

5. The optical engine system according to claim 3, further comprising:
a first total internal reflection prism arranged between the first modulation device and the light combining prism, and configured to guide the first linearly polarized light which transmits along the first optical path to be incident to the first modulation device and to guide the first modulated light emitted from the first modulating device to be incident to the light combining prism; and
a second total internal reflection prism arranged between the second modulation device and the light combining prism, and configured to guide the second linearly polarized light transmitted along the second optical path to be incident to the second modulation device and to guide the second modulated light emitted from the second modulating device to be incident to the light combining prism.

6. The optical engine system according to claim 5, wherein the optical paths of the first linearly polarized light, the second linearly polarized light, the first modulated light, the second modulated light, and the projection light are located in a same plane.

7. The optical engine system according to claim 6, wherein positions of the guiding element, the first total internal reflection prism, the second total internal reflection prism, and the light combining prism are adjustable in such a manner that optical paths of incident light and exit light of the guiding element, the first total internal reflection prism, the second total internal reflection prism and the light combining prism are located in a same plane.

8. The optical engine system according to claim 1, further comprising a linearly polarized light converter configured to convert incident illumination light into linearly polarized light for obtaining the first linearly polarized light and the second linearly polarized light.

9. The optical engine system according to claim 8, further comprising:
a light homogenizing device, wherein the illumination light is incident to the linearly polarized light converter after being homogenized by the light homogenizing device.

10. The optical engine system according to claim 9, wherein the light homogenizing device comprises a double fly-eye lens or an optical integrator rod.

11. The optical engine system according to claim 3, further comprising:
a reflection element configured to guide the linearly polarized light to the guiding element.

12. A display apparatus comprising an optical engine system, wherein the optical engine system comprises:
a first modulation device configured to modulate first linearly polarized light in a first optical path to obtain first modulated light;
a second modulation device configured to modulate second linearly polarized light in a second optical path to obtain second modulated light, the first linearly polarized light and the second linearly polarized light having a same polarization state; and
a light combining prism comprising a first lens, a second lens, and a light combining coated layer located between the first lens and the second lens, and configured to guide the first modulated light and the second modulated light to be transmitted along a same optical path and obtain projection light;
wherein optical paths of the first modulated light, the second modulated light, and the projection light are located in a same plane, and the first modulated light, the second modulated light, and the projection light have a substantially same polarization state.

13. The display apparatus according to claim 12, wherein the light combining coated layer is configured to adjust a transmission direction of incident light based on a wavelength range of the incident light.

14. The display apparatus according to claim 13, wherein the optical engine system further comprises a guiding element configured to separate, based on a wavelength range, received linearly polarized light into the first linearly polarized light transmitted along the first optical path and the second linearly polarized light transmitted along the second optical path.

15. The display apparatus according to claim 14, wherein the guiding element is configured to reflect part of the linearly polarized light with at least one color to obtain the first linearly polarized light, and to transmit the remaining part of the linearly polarized light to obtain the second linearly polarized light.

16. The display apparatus according to claim 14, wherein the optical engine system further comprises:
a first total internal reflection prism arranged between the first modulation device and the light combining prism, and configured to guide the first linearly polarized light which transmits along the first optical path to be incident to the first modulation device and to guide the first modulated light emitted from the first modulating device to be incident to the light combining prism; and
a second total internal reflection prism arranged between the second modulation device and the light combining prism, and configured to guide the second linearly polarized light transmitted along the second optical path to be incident to the second modulation device and to guide the second modulated light emitted from the second modulating device to be incident to the light combining prism.

17. The display apparatus according to claim 16, wherein the optical paths of the first linearly polarized light, the second linearly polarized light, the first modulated light, the second modulated light, and the projection light are located in a same plane.

18. The display apparatus according to claim 17, wherein positions of the guiding element, the first total internal reflection prism, the second total internal reflection prism, and the light combining prism are adjustable in such a manner that optical paths of incident light and exit light of the guiding element, the first total internal reflection prism, the second total internal reflection prism and the light combining prism are located in a same plane.

19. The display apparatus according to claim 12, wherein the optical engine system further comprises a linearly polarized light converter configured to convert incident illumination light into linearly polarized light for obtaining the first linearly polarized light and the second linearly polarized light.

20. The display apparatus according to claim 19, wherein the optical engine system further comprises:
a light homogenizing device, wherein the illumination light is incident to the linearly polarized light converter after being homogenized by the light homogenizing device.

* * * * *